March 13, 1962     C. E. VANDENBERG     3,024,941
TEMPERATURE CONTROLLED INSULATION
Filed Nov. 28, 1958     2 Sheets-Sheet 1

INVENTOR.
CORNELIUS E. VANDENBERG
BY Noel H Conway
AGENT

INVENTOR.
CORNELIUS E. VANDENBERG

BY Noel H. Conway

AGENT

United States Patent Office 3,024,941
Patented Mar. 13, 1962

3,024,941
TEMPERATURE CONTROLLED INSULATION
Cornelius E. Vandenberg, Fullerton, Calif., assignor to
North American Aviation, Inc.
Filed Nov. 28, 1958, Ser. No. 776,820
7 Claims. (Cl. 220—63)

This invention relates to insulation means and more particularly to temperature controlled insulation means.

More particularly this invention relates to insulation means which occupies little space at normal ground temperatures but which will expand and become more effective insulation when the ambient temperature increases beyond a predetermined point. More specifically this invention relates to insulation means to be mounted on the interior of the fuel tank of a high speed aircraft which will expand when the skin of the aircraft becomes hot during flight, after part of the fuel has been used up from the fuel tank.

As operating speeds of aircraft increases, the need for insulation means to protect the interior of the aircraft from the heat generated by the friction of the air passing the skin of the aircraft also increases until it has become a requirement. For instance, at Mach 3.0 the skin temperature due to air friction exceeds 1000° F. There are several problems which occur if such heat is allowed to flow unchecked into the fuel tank of the aircraft. Among these problems are (1) decomposition of the fuel (2) excessive tank pressures (3) loss of fuel vapors which are boiled off rapidly and (4) the increased possibilities of an explosion. One solution to this problem might be to redesign the airframe to provide a double wall structure with a low heat conducting material or space between the walls. However, such double wall missile bodies are difficult and expensive to fabricate over and above the fact that such construction adds considerable weight to a missile and takes up space which could be used for fuel. Another possible solution is the idea of providing some sort of insulating material on the interior of the tank walls, but such material takes up valuable space which could be used for fuel as well as adding dead weight to the aircraft.

The present invention completely solves the above problems. The applicant has provided a lightweight installation which is mounted on the interior of the aircraft which takes only a negligible amount of room in the fuel tank when the aircraft is fully fueled on the ground and during initial flight. Then during high speed flight the insulation means will automatically expand and become more effective as required, when the skin temperature is increased beyond a predetermined point by the heat of the air friction. In order to accomplish this effective insulation the present invention includes a flexible wall mounted within the fuel tank and a filler material therebetween which will vaporize at a predetermined temperature dependent upon the proposed operational environment of the aircraft. As is commonly known, when materials sublime or evaporate the volume of the resulting gas at the same temperature is many times larger than the original liquid or solid. In the case of water the resulting gas at 212° F. and one atmosphere pressure would have a volume approximately 1600 times as large as the water in the liquid phase. This large increase in volume of the filler material moves the inner flexible wall inwardly away from the outer wall of the fuel tank which has become hot due to aerodynamic heating, forming a dead vapor space type of insulation.

Therefore it is an object of this invention to provide temperature controlled insulation means.

It is a further object of this invention to provide an insulation and means to expand it and increase its insulation qualities at higher temperatures.

It is a still further object of this invention to provide a wall insulation means having a plurality of members which have means within them to cause the members to expand away from a wall to which they are attached at a predetermined temperature to thereby create a more effective insulation.

An additional object of this invention is to provide a fuel tank insulation which will take up a negligible amount of space within the fuel tank and then will expand to increase the insulating qualities after the aircraft is in flight and the fuel tank walls have become hot due to air friction.

Other and further objects of this invention will become apparent in the detailed discussion below, wherein.

Figure 1:
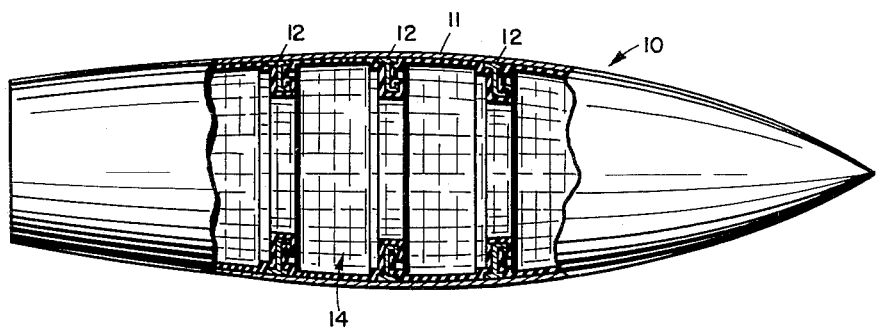
FIG. 1 is a partial cutaway view of a missile with one form of the subject insulation means in the main fuel tank.

Since the present invention is particularly useful in fuel tanks of high speed aircraft and missiles, FIG. 1 shows a partially cutaway view of a missile indicated generally by the arrow 10 having the present invention mounted in the main fuel tank therein. As is customary the missile has its outer skin 11 supported by a series of circular frames 12 to give the missile rigidity and strength. The insulation means indicated generally by the arrow 14 are mounted so as to substantially cover the entire internal surface of the fuel tank walls which are exposed to the heat of the air friction. Naturally the present insulation could be used to insulate any compartment or wall in the missile or anywhere else, however the insulation is particularly useful in fuel tanks in which it is desired to have maximum capacity at normal ambient conditions but which require increased insulation characteristics to protect the remaining fuel from external heat sources after part of the fuel has been used from the tank.

Figure 2:
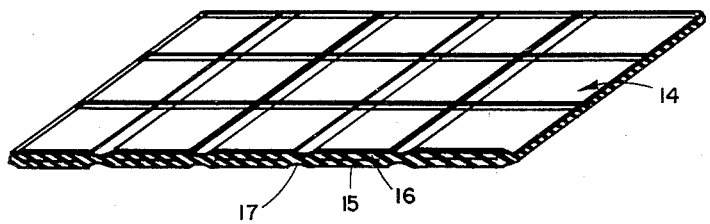
FIG. 2 is an isometric view of a modification of the insulation means after manufacture and before installation.

FIG. 2 shows one modification of the present invention. The insulation means is constructed of an outer wall 15 and an inner wall 16 and formed into a plurality of small inflatable compartments or members by a series of criss-crossing seams 17. Due to the orientation of the seams 17 the inflatable members are formed as adjoining squares, however other configurations such as triangles may be used. Several materials such as silicon rubber, Teflon, or glass cloth impregnated with synthetic rubber are usable to form the outer wall 15 and the inner wall 16 depending upon the operating environment. At higher temperatures materials such as aluminum may be used as shown below. Each of these materials may be formed as thin flexible gas tight walls which will not react chemically with the fuel. A filler substance is located between the inner and outer walls 16 and 15 respectively, in order to provide temperature responsive means to cause the inflatable members to be inflated. This filler substance can be any one of a number of materials which will vaporize at the temperature desired such as water, carbon tetrachloride, gasoline, or other hydrocarbons, or a solution of 76% diphenyl oxide, 24% diphenyl (Freon 12), diphenyl ether, dibutylphthalate, triphenyl phosphate, or tritolyl phosphate, or a solid material which will melt and evaporate or sublime easily, such as biphenyl, cetyl alcohol, or hexachlorethane. These materials will vaporize between 180° F. and 750° F. which in ambient conditions of less than 20 p.s.i. is sufficient pressure to provide the proper expansion as needed. In some cases it is desirable to use two filler materials in one inflatable member having different evaporation temperatures. Thereby, as the skin temperature increases with flight speed, one of the materials will expand the insulation at a predetermined lower temperature increasing the insulation characteristics of the inflatable members, and then the other filler material will vaporize at the predetermined higher temperature expanding the insulation further when better insulation is needed.

The insulation means shown in FIG. 2 can be made by any one of a number of processes according to the materials used. If for example, silicon rubber is used then one of the walls, for example outer wall 15, would be laid out flat and cement or glue would be applied along the lines where seams 17 were to be formed. Then filler material 18 would be placed on that wall so that there would be a proper amount of water or such other substance in each of the inflatable members when the insulation means is complete. Then the other wall is placed on top of the first wall and heat and pressure is applied along the seam 17 to form the bond between the outer and inner walls. As glass cloth does not stretch very much the inside wall 16 is normally formed with extra cloth and convolution portions such as in the other modification of the invention described below in order that inflatable member be able to expand.

Figure 3:
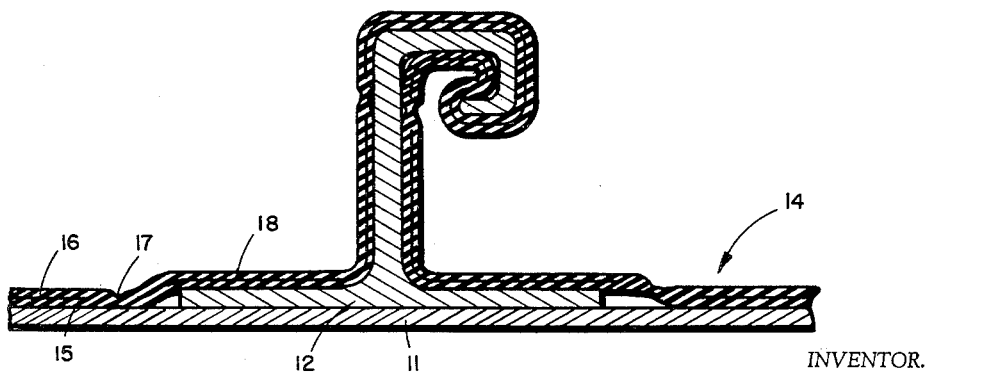
FIG. 3 shows one form of the installation installed on the inside of the fuel tank walls at normal ground temperatures.

FIG. 3 shows a detailed view of the first modification of the insulation means after it has been applied into the airframe. It is apparent from FIG. 2 that the insulation means can be formed as blankets and then applied into the missile uniformly over any stringers, frames or ribs as well as the skin panels in order to further minimize heat flow. Then the insulation is drawn tightly to the wall of the fuel tank by evacuating the space between the insulation and the tank wall and held in place by some suitable means such as resin, glue, or metal clips. With this configuration it can be seen that at normal ground temperatures the insulation can take less than 1/32 of an inch from the radius of the fuel tank which is practically negligible. Such structure provides some insulation due to the thickness of walls 15 and 16, but the insulation characteristics of the insulation means is greatly increased when the temperature exceeds the predetermined point at which the filler material is vaporized.

Figure 4:
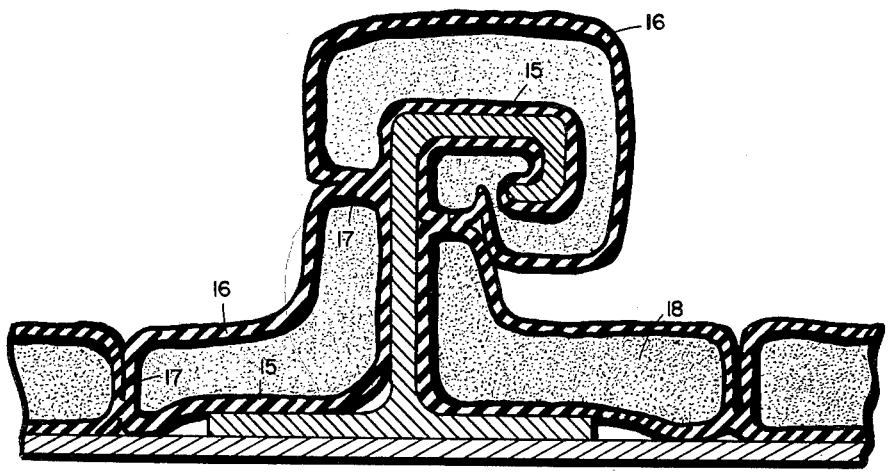
FIG. 4 shows the installation when the skin temperature has been raised and the installation has been expanded to become more effective.
Figure 5:
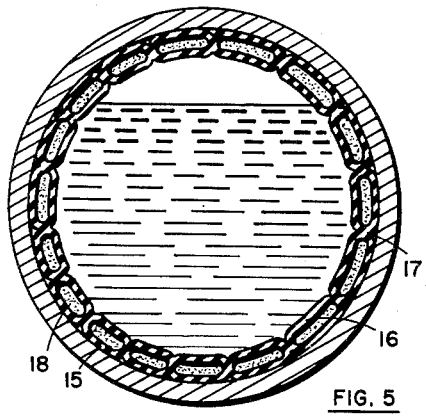
FIG. 5 shows a cross sectional view of one form of the installation means installed in a fuel tank; and, FIG. 6 shows a second modification of the insulation using aluminum foil.

FIGS. 4 and 5 show the first modification of the insulation when the temperature of the wall has increased to a point where the filler material has vaporized thus inflating the inflatable members providing a dead vapor space type of insulation which is very effective. When the insulation means is used in a typical missile application in which the fuel tank occupied the entire cross-section of the missile body the installation means would be located around the entire inner perimeter of that fuel tank as shown in FIG. 5. As can be seen, in this fuel tank or in other liquid tanks the pressure exerted by fuel on the inflatable members is greater at the bottom of the tank than it is at the top or sides of the tank. This is due to the hydraulic head of the fuel. This fact, in addition to the pressure on the fuel, must be taken into consideration when deciding how much and what type of filler materials should be placed in the various inflatable members. Generally, more filler materials should be placed in the inflatable members which will be located at the bottom of the tank than in those members which will be located at the side and top of the tank. The amount of this increase is primarily dependent upon the weight of the fluid above that particular inflatable member, however, it should be noted that the bottom of the fuselage or wings of aircraft are normally hotter than the top or sides because of the air friction which causes more expansion and tends to counteract the effect of the weight of the fuel.

The exact amount of filler material required is dependent upon the characteristics of that material, however, if water were used for example, satisfactory results may be obtained by providing a layer of water between the outer and inner skins 15 and 16 respectively, of approximately 0.001 inch thick along the upper sides and top of the tank while providing enough water in the other lower inflatable members to form a film of water which is approximately 0.0015 inch thick. With inflatable members which have an area of 1 sq. ft. this would mean that approximately 0.144 cubic inch of water would be placed in the upper inflatable members and a little over two-tenths of a cubic inch of water would be placed in the lower inflatable members. In a missile in which the total height of the fuel in the tank is not over 10 ft. and the tank is pressurized to one atmosphere of pressure at sea level, this amount of water would cause an insulation space approximately 1.6 inches thick when the external heat incrases the vapor pressure of the water enough to vaporize it. The overall heat transfer coefficient of this structure is near that of a dead air space of similar thickness.

Figure 6:
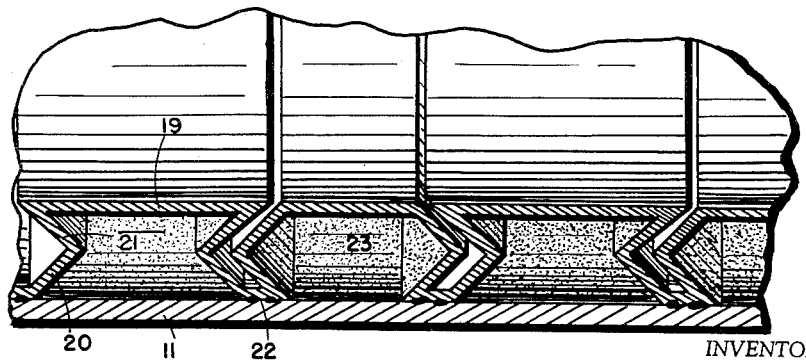

FIG. 6 shows a second modification of the present invention in which the inflatable members are constructed of materials which may be deformed but cannot be stretched like rubber. In this case the inflatable members may be made of aluminum foil since it is inexpensive, lightweight and flexible. A foil thickness of approximately 0.002 or 0.003 inch thick is satisfactory for this use. As can be seen the aluminum flexible material forms the inflatable members after it has been attached to the wall 11 of the tank by some suitable means such as seam welding at portions 22 which extend around the perimeter of the tank in circumferential bands. The inflatable members are formed with integral expansible convolute portions 20 and 21 extending between the inner wall portion 19 of the inflatable members and the skin of the missile 11 in order that the inner wall portion 19 may be expanded away from the skin of the missile 11 when the filler material 23 which is provided within each of the inflatable members is vaporized. The inflatable members are not provided with an outer wall in this modification, but may be so provided if it is desired. Any of the filler materials suggested in conjunction with the first modification of the invention are suitable for use in this second modification.

For simplicity of design there are no seam welds extending at right angles to the seam welds at portions 22. This is because the aluminum foil is thin enough that as the inner wall 19 is expanded inwardly away from the wall 11 the wall 19 will wrinkle enough to compensate for the shrinkage in its length around the perimeter of the missile. Naturally the shape of inflatable members can be varied in order to meet the requirements of tanks of various sizes and shapes.

While only two representative embodiments and details have been shown for the purposes of illustrating the invention, it will be apparent to those skilled in the art that various modifications and changes may be made therein without departing from the spirit of the invention and the scope of the appended claims.

I claim:

1. Means to insulate a fluid tank having walls, of which at least a portion of one wall is exposed to a source of heat, comprising a plurality of inflatable members mounted on and contiguous with the interior of said last mentioned portion, temperature responsive means adapted to be independent of the fluid within said fluid tank and adjacent to and cooperating with said members to increase the insulation characteristics of said members by inflating said members when the temperature of said tank wall exceeds a predetermined point.

2. Means to insulate a fluid tank in a high speed aircraft comprising a plurality of inflatable members mounted on and contiguous with the interior of at least one wall of the tank, temperature responsive means adjacent to and cooperating with said members to inflate said members when the temperature of said tank wall exceeds a predetermined point.

3. In a fluid tank having enclosing walls of which the exterior of at least one wall is exposed to a source of heat, a plurality of inflatable members mounted contiguously to said last mentioned wall, a predetermined amount of filler material having a predetermined vaporizing point located within said inflatable members, whereby when said wall is heated to a temperature above said predetermined vaporizing point said material will vaporize causing the inflatable members to expand and form a dead vapor space insulation.

4. In a fluid tank having enclosing walls of which the exterior of at least a portion of one wall is exposed to a source of heat, a plurality of inflatable members mounted contiguously to said last mentioned portion, predetermined amounts of filler material having predetermined vaporizing temperatures located within said inflatable members, whereby when said wall is heated to a temperature above one of said predetermined temperatures said material will vaporize causing the inflatable members to expand and form a dead vapor space insulation.

5. Insulation means for a high speed aircraft to insulate an interior compartment from the heat generated by the air friction on the aircraft outer skin comprising a plurality of inflatable members attached to and covering the inner side of the aircraft skin exposed to said heat, said inflatable members being made of a fluid tight flexible material having an inner wall which may be moved away from said skin, temperature responsive means adjacent to and communicating with the interior of said inflatable members to cause each of said members to expand and said inner walls to move away from said skin.

6. Insulation means for a high speed aircraft to insulate an interior compartment from the heat generated by the air friction on the aircraft outer skin comprising a plurality of inflatable members attached to and covering substantially all of the inner side of the aircraft skin exposed to said heat, said inflatable members being made of a fluid tight flexible material having an inner wall which may be moved away from said skin, temperature responsive means within each of said inflatable members to cause each of said members to expand and said inner walls to move away from said skin.

7. The insulation means as claimed in claim 6 wherein the temperature responsive means within the inflatable members comprises a filler material which will vaporize and greatly expand at a predetermined temperature.

References Cited in the file of this patent

UNITED STATES PATENTS

| | | |
|---|---|---|
| 2,513,749 | Schilling | July 4, 1950 |
| 2,516,552 | Clark et al. | June 25, 1950 |
| 2,540,331 | Hlavaty | Feb. 6, 1951 |
| 2,676,773 | Sanz | Apr. 37, 1954 |
| 2,801,526 | Solley | Aug. 6, 1957 |